March 15, 1955   C. H. BRAUCHLER ET AL   2,703,922
COMPOSITE TURBINE ROTOR DISC AND METHOD OF MAKING SAME
Filed Jan. 19, 1949   3 Sheets-Sheet 1
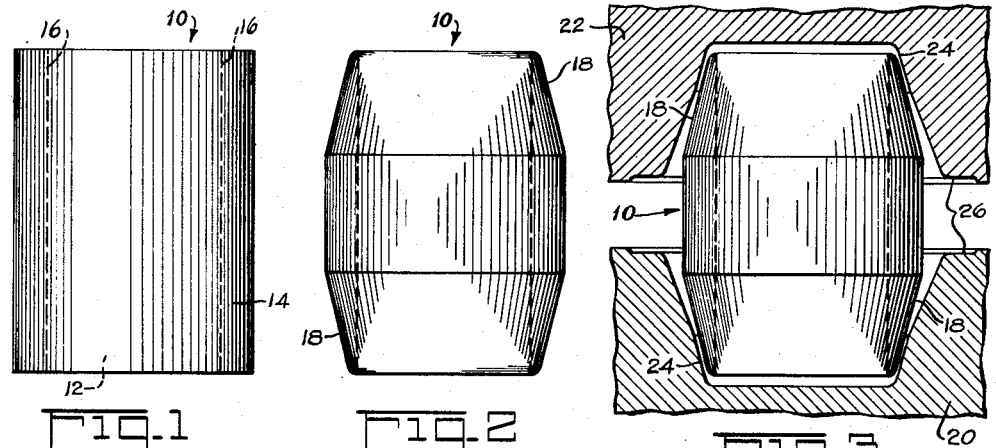
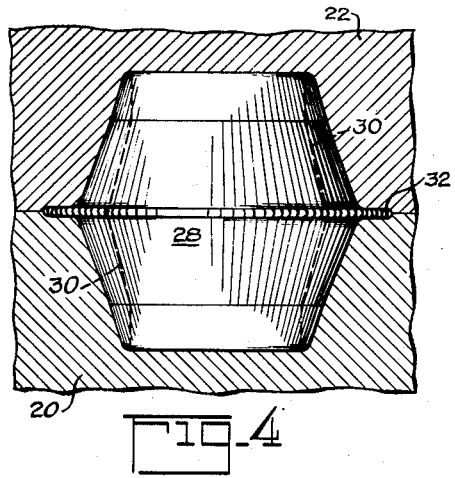
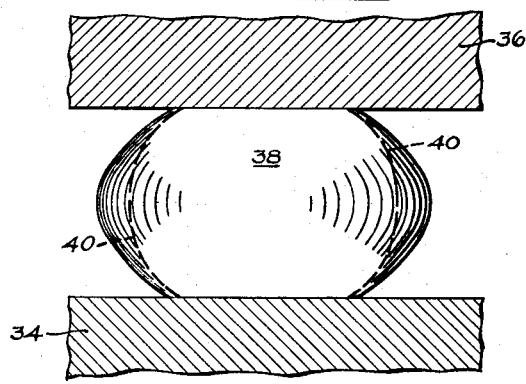
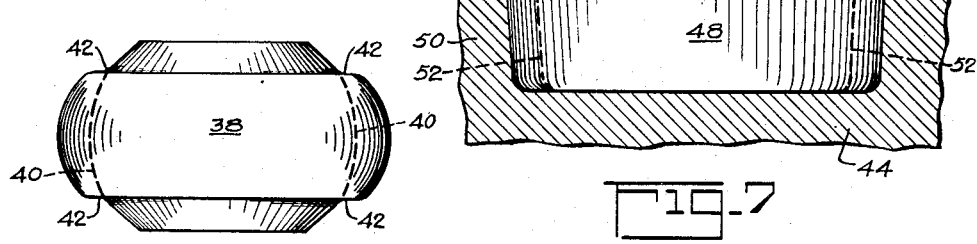
INVENTORS
HERMAN H. HANINK.
CHANDIS H. BRAUCHLER.
BY Victor D. Behr
ATTORNEY March 15, 1955 C. H. BRAUCHLER ET AL 2,703,922
COMPOSITE TURBINE ROTOR DISC AND METHOD OF MAKING SAME
Filed Jan. 19, 1949 3 Sheets-Sheet 2
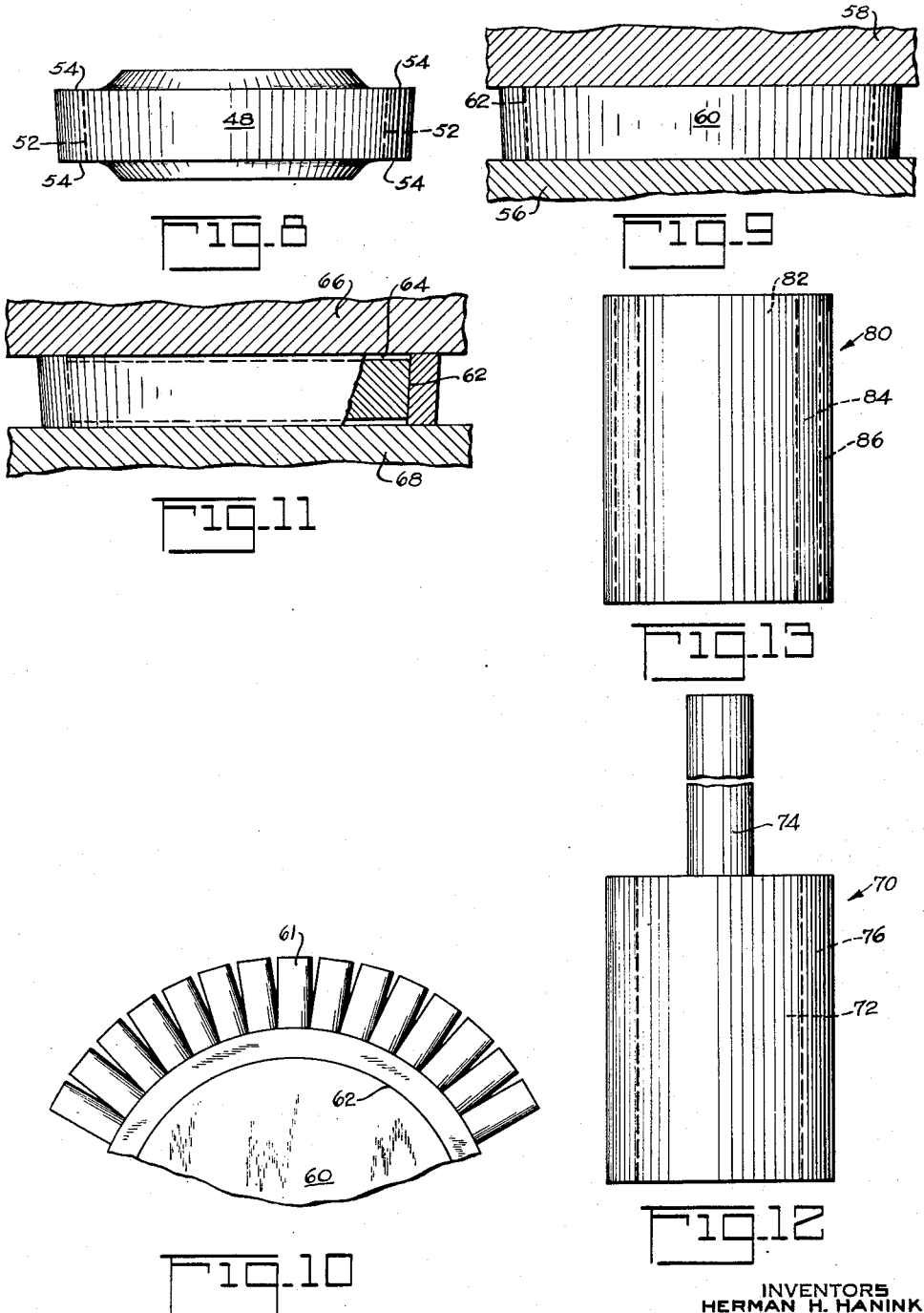
INVENTORS
HERMAN H. HANINK.
CHANDIS H. BRAUCHLER.
BY Victor D. Behm
ATTORNEY

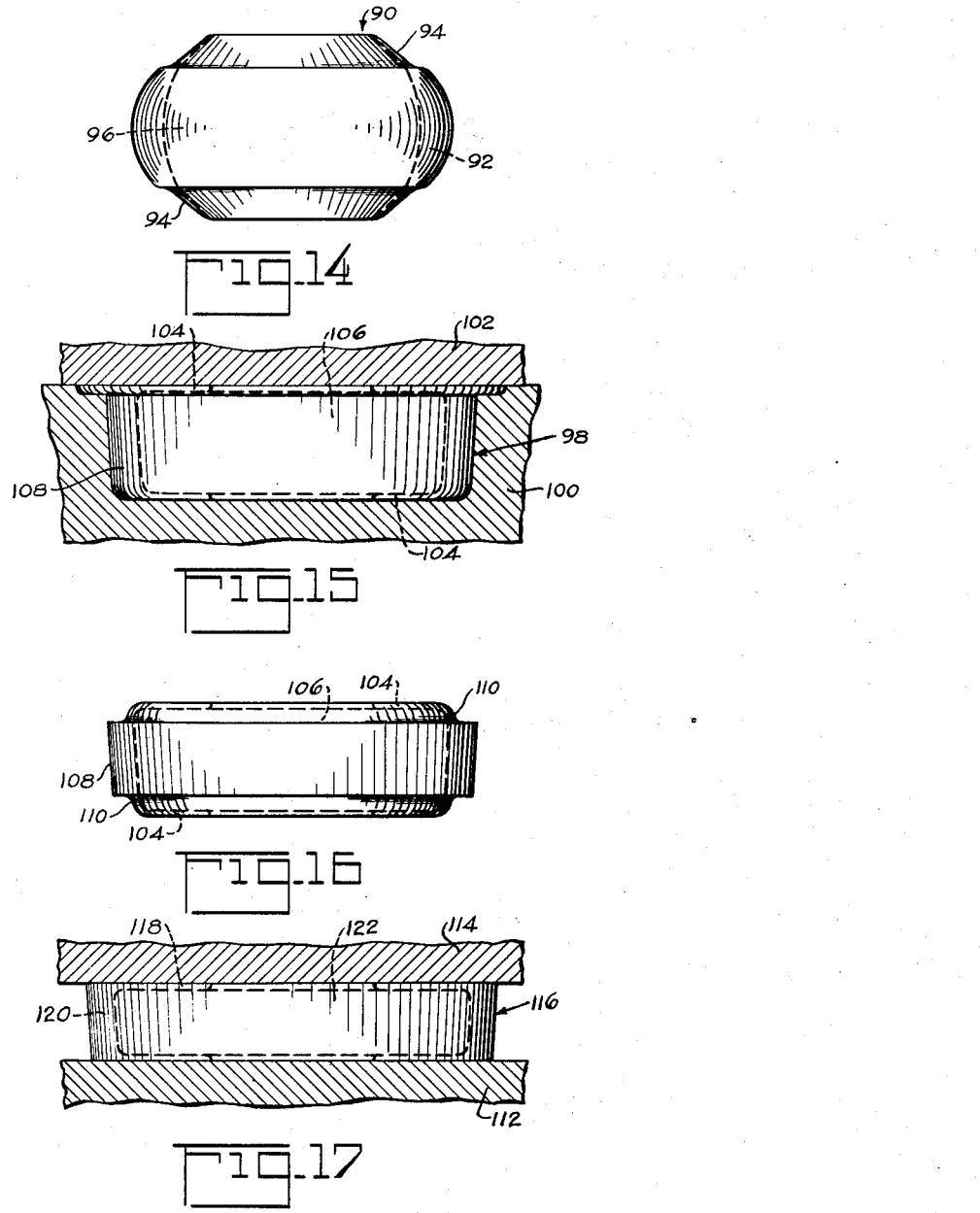

United States Patent Office 2,703,922
Patented Mar. 15, 1955

2,703,922

COMPOSITE TURBINE ROTOR DISC AND METHOD OF MAKING SAME

Chandis H. Brauchler, Canton, Ohio, and Herman H. Hanink, Ridgewood, N. J., assignors to Curtiss-Wright Corporation, a corporation of Delaware Application January 19, 1949, Serial No. 71,632

15 Claims. (Cl. 29—194)

This invention relates to composite metal articles and to a method of fabricating same. More particularly, the invention is directed to a method of making a new and improved rotor disc for a gas turbine. As used herein a turbine rotor disc is considered to be the disc portion of the turbine rotor to which the turbine rotor blades are attached.

The efficiency and power output of a gas turbine increases with increase in the temperature of the turbine combustion gases. Thus modern gas turbines are operated at maximum gas temperatures well over 1000° F. It is essential therefore, that the rim of a turbine rotor disc have high heat and corrosion resistant properties. In addition, because the turbine rotor blades are secured to the rim of the turbine rotor disc, said rim should have sufficient ductility to minimize stress concentrations at the points of attachment of said blades to the rotor disc and to reduce the effects of thermal fatigue stresses in the rim of said rotor disc. If said rotor blades are to be welded to the turbine rotor disc, then the rim of said disc should also have good weldability. Alloys having said properties as well as having sufficient strength for the hub of the rotor disc are quite expensive, and difficult to forge, and in addition include critically short materials. Radially inwardly of its rim, a turbine rotor disc is subjected to progressively lower temperatures. Accordingly the core or hub of a turbine rotor disc need not have heat and corrosion resistant properties to the high degree required at its rim but said core should preferably be stronger than said rim.

Prior to the present invention, it has been suggested that a composite rotor disc be fabricated by welding an annular rim to a core, said core and rim having the desired physical properties. However, such a welding procedure is both quite expensive and difficult. In addition this welding operation may not produce uniformly satisfactory rotor discs in that the welding operation introduces relatively brittle and low strength cast material between the core and rim and also may result in the formation of welding cracks both in the weld metal and in the core material immediately adjacent to the weld. The latter defects in the core material are particularly common because the core generally comprises a material which is highly hardenable by heat treatment, such as results from air cooling the material from at or near the welding temperature. Brittleness in this same region may also result from local overheating of the core material from the heat produced by welding. Accordingly, an object of the present invention resides in the provision of a novel method of making an improved composite turbine rotor disc having an annular rim bonded to its core or hub, the bond, rim and core having the desired physical characteristics.

Specifically the novel turbine rotor disc of the present invention is fabricated by forming a composite cylindrical metal body by casting a first metallic material in a mold to and about a solid core of a second metallic material, thereby forming an annular rim bonded to said core. Said core is made of a material which is relatively inexpensive, is readily forged, and is hardenable by heat treatment, while the material of said rim has high heat and corrosion resistant properties and becomes stronger and more ductile by hot-working. This composite metal body is axially upset, by hot-working, to form a disc corresponding roughly to the overall diameter of the finished turbine disc, and then said disc is heat treated to harden its core.

It has been found that this hot-working upsetting operation greatly improves the physical properties of the material. Thus, the ductility and tensile strength of the rim material are greatly increased. In addition said upsetting operation minimizes or eliminates the brittleness and low fatigue strength in the core material adjacent to the rim as caused by local over-heating of the core material during the casting, and resulting fusion, of the rim material thereto.

At this point it should be noted that the term "upsetting," as herein used, is limited to a forging operation on at least a portion of a body such that said body portion is both widened and shortened by said operation. Also the term "hot-working" is used in its usual sense, said term meaning forging a metal at temperatures sufficiently high that no appreciable strain-hardening of the metal occurs.

Other objects of the invention will become apparent upon reading the annexed detailed description in connection with the drawing, in which:

Figure 1 is a side elevation of the composite cylindrical metal body from which the turbine rotor disc of the engine is formed;

Figures 2, 3, 4, 5, 6, 7, 8, and 9, schematically illustrate successive steps of the invention in the method of fabricating a turbine rotor disc;

Figure 10 is a schematic view of a turbine rotor including a rotor disc embodying the invention and to which the turbine rotor blades are secured;

Figure 11 illustrates an optional additional step;

Figures 12 and 13 are views corresponding to Figure 1, but illustrating modifications of the invention; and Figures 14, 15, 16, and 17 are views corresponding to Figures 6, 7, 8, and 9, but illustrating a further modification of the invention.

Referring to the drawing, Figure 1 illustrates a composite metallic cylindrical body 10 having a core portion 12 of a suitable first metallic material and an annular rim portion 14 of a suitable second metallic material, said rim portion embracing and being bonded to said core portion. The annular bond surface between said core and rim portions is indicated by a dashed-line 16 in Figure 1. The composite metal body 10 is formed by placing a forged cylindrical billet co-axially in a mold and spaced from the walls of said mold. A suitable metal is cast in said mold about said billet, whereby the molten cast metal fuses with a portion of the outer surface of said billet to form said composite body 10. Preferably said rim 14 is cast to the core 12 by the method described in Patent Numbers 2,107,943, and 2,191,481, issued to R. K. Hopkins, in which fusion of the cast metal to the base metal is improved by the discharge of an electric current or arc.

For making a turbine rotor disc, it has been found satisfactory that the core 12 of the composite body 10 be made from a billet forged from steel defined by S. A. E. specification number 4340, and that the rim 14 of said body comprise an alloy containing the following elements in the percents indicated, within the usual commercial limits:

| Elements: | Per cent |
|---|---|
| Carbon | .30 |
| Manganese | 1.00 |
| Silicon | .55 |
| Chromium | 19.00 |
| Nickel | 9.00 |
| Molybdenum | 1.25 |
| Tungsten | 1.25 |
| Columbium | .40 |
| Titanium | .30 |
| Iron | Balance |

Unless otherwise stated, the remainder of the process of fabricating the turbine rotor disc, as hereinafter described, assumes the use of these two steel alloys as indicated for the rim and core of the composite metal body 10. Accordingly the core 12 of the body 10 is relatively malleable or forgeable but is hardenable by heat treatment, while the rim has relatively high heat and corrosion resistant properties and is relatively weak and brittle initially but is rendered stronger and more ductile by hot-working. Obviously, however, other steel alloys having said properties may be used for the rim and core of the body 10. The desired physical properties of the metal of the core 12 and rim 14, for a turbine rotor, are hereinafter fully described.

The body 10 is now hot-worked by a series of upsetting operations. First, however, the rim 14 of the composite metal body 10 is machined so that the ends of said body are tapered, as indicated at 18 in Figures 2 and 3. The tapered body 10 is then heated to approximately 2100° F. and is thoroughly soaked at this temperature prior to the subsequent upsetting forging operation. The tapered metal body 10 is then placed between forging dies 20 and 22 for axially upsetting said body. As illustrated, each die 20 and 22 has a tapered portion 24, adjacent to the bottom of said die. The tapered portion 24 of each die 20 or 22 has a slope similar to that of the taper 18 on the ends of the body 10, and said dies flare outwardly from their tapered portions 24 to annular gutters 26 for the flash resulting from said hot-working upsetting operation. The taper 18 at the ends of the metal body 10 and the mating taper 24 at the bottoms of the dies 20 and 22, serve to accurately center the body 10 within said dies.

Upon completion of said upsetting operation, the composite metal body assumes the shape of the closed dies 20 and 22 as illustrated at 28 in Figure 4, the bond line or surface between the rim and core portions of the body 28 being indicated by the dashed-line 30. The rim 14 of the body 10 is initially relatively brittle, so that the taper machining of the ends of said body facilitates said upsetting operation.

The flash 32 is now removed and the body 28 is again heated and soaked at approximately 2100° F. whereupon said body is further hot-worked by placing said body between two flat forging dies 34 and 36 and axially upsetting said body by said dies to the condition illustrated at 38 in Figure 5.

As a result of this upsetting operation, the rim portion of the body 38 tends to bend over the end faces of said body and the bond line 40 between the rim and core portions of said body tends to follow the contour of the outer periphery of said rim. This bending of the rim over the end faces of the core is quite apparent in Figure 5. To avoid further bending of the rim over the end faces of the core, the rim portion of the body 38 is now axially cut back, as illustrated at 42 in Figure 6, so as to leave the rim with an axial thickness approximating the axial thickness to which the core of the body is to be axially upset in the next hot-working forging operation. The body is now again heated and soaked at approximately 2100° F. and is further hot-worked by placing said body between two forging dies 44 and 46 which are operated to axially upset said body to the condition illustrated at 48 in Figure 7. In addition to its flat bottom surface the lower die 44 is also provided with an annular retaining wall 50, the inner surface of which is substantially cylindrical and parallel to the axis of the body 48.

With this arrangement, the outer edge of the rim of the body 44 becomes substantially cylindrical as illustrated in Figure 7. Accordingly the bond line 52 or surface between the rim and core portions of the body 48 appears substantially straight in Figure 7. Actually, the retaining wall 50 is provided with a small taper of about 5°, to facilitate removal of the upset body 48 from the die 44.

The rim of the axially upset body is again cut back as illustrated at 54 in Figure 8 to leave a rim thickness approximately equal to that to which the core is to be upset in the next hot-working forging operation. The body is then again heated and soaked at approximately 2100° F. and is placed between flat forging dies 56 and 58. Thereupon the body is further hot-worked by axially upsetting said body between the dies 56 and 58, to the flat circular disc 60 illustrated in Figure 9, said disc having a diameter roughly equal to the desired diameter of the turbine rotor disc. Thereafter turbine rotor blades 61 are secured to the rim of said disc, in any conventional or suitable manner, so as to project from said rim, for example as illustrated in Figure 10. In Figures 9 and 10, the bond line between the core and rim portions of the disc 60 is indicated by the line 62.

For simplicity, in the aforedescribed upsetting operations, the forging dies are illustrated and described as having flat facing surfaces thereby forming flat end surfaces on the forged rotor. Obviously said rotor end surfaces need not be forged flat. Thus the facing surfaces of the forging dies may be shaped to forge the rotor end surfaces to any desired shape.

Prior to attachment of the rotor blades 61, the core of the rotor disc 60 is hardened by heat treatment. For example, said disc is heated to approximately 1550° F. and held at that temperature for a length of time sufficient to austenitize the core material, that is, to render the core of the disc 60 substantially completely austenitic. The disc 60 is then quenched in a suitable oil. It has been found satisfactory, for example, to use a mineral oil having a viscosity of 100 Saybolt seconds at 100° F. The disc 60 is quenched in said oil, with the temperature of said oil approximately equal to 130° F., and said disc is removed from said oil when the temperature of said disc drops to somewhere between 200 to 300° F. The disc 60 is then tempered at a temperature depending on the desired core hardness. A tempering temperature of 1200° F. has been found satisfactory. This tempering operation has the further function of relieving internal stresses in the core and rim.

When the rim 14 is cast and fused to the core 12 to form the body 10, the material of the core 12 is overheated in the vicinity of the bond or junction 16, thereby rendering this portion of the core brittle, and decreasing its fatigue strength. It has been found that the hot-working upsetting operations, in forming the rotor disc 60 from the body 10, minimizes or entirely eliminates this brittleness and increases the fatigue strength, provided the length of the body 10 is reduced, by said upsetting operations, at least one-half and preferably at least two-thirds.

Said upsetting operations also develop, within the core and rim portions of the disc 60, a radial grain flow which is continuous across the bond line or surface between said core and rim portions 62. This metallographic property of uniform and homogeneous radial grain flow is obviously very desirable in a turbine rotor disc. In addition, the hot-working upsetting operations on the rim material not only increase its ductility but also increase its yield strength 25 to 50%. Because the turbine blades of a turbine rotor disc are secured to the periphery or rim of said disc, the ductility of the rim of said disc minimizes stress concentrations at the points of attachment of said blades to said rim. In addition, the ductility of said rim minimizes the effect of thermal fatigue stresses in said rim. Also, with the rim made from the aforedescribed steel alloy, the turbine rotor blades may be welded thereto.

In addition to the aforedescribed physical properties of the rotor disc 60, the nature of the bond or junction between its rim and core is such that in any physical test of a specimen of the rotor disc extending across said bond or junction, said specimen will fail in either its rim or core portion depending on which of these is weakest in the particular physical property being tested. In fact, the failure of said specimen will be typical of the normal physical properties of the material of the rim or core in which said failure occurs. By "normal" physical properties of, for example the core material, is meant the physical properties of said material by itself with it having been subjected to same forging and heating treating operations as the core of said disc 60. Accordingly, each physical property of the bond or junction between the rim and core is at least equal to the corresponding normal physical property of the rim or core material, whichever happens to be the weakest. This obviously would not be true if said rim and core were welded together.

When the rim material is cast about a cylindrical billet to form the composite body 10 (Figure 1)—for example by the process described in the aforementioned patents to R. K. Hopkins—a portion of the said billet or core melts and mixes with the rim material. It has been found that the extent of this contamination of the rim material with the core material is such that each element of the core is also present in the rim in percentages ranging approximately from $\frac{1}{5}$ to $\frac{1}{3}$ their respective percentages in the core plus a percentage resulting from the amount of said elements present in the original rim material prior to its fusion with said core. For example, if the core comprises a plain carbon steel with 0.4 percent carbon and, if prior to its fusion with said core, the rim material contains no iron or carbon, then after said fusion, the rim would contain approximately 20 to 33⅓ percent iron and 0.08 to 0.13 percent carbon.

The actual magnitude of the contamination of the rim with the elements of the core depends on various factors. For example, the magnitude of said contamination is generally increased (1) by increasing the mass of the rim relative to that of the core and (2) by changing the rim alloy to one requiring a higher melting temperature for proper alloying of its elements and for proper fusion with the core.

This contamination of the rim material by the core material obviously limits the selection of the core and rim materials which can be used. For example, starting with a steel core or billet having a composition defined by S.A.E. specification number 4340, it is necessary to select a composition for the rim, having the desired physical properties and having a composition such that of the elements present in the core, their percentages in said rim composition are at least equal to ⅕ to ⅓ their respective percentages in the core. After selecting a desired composition for the rim, the actual amount of contamination of the rim, by the addition of the elements of the core thereto, would have to be determined by experiment. Having determined said amount of contamination, the actual percent of each element in the alloy to be cast about and fused with the core or billet to form the rim 14 must be less than its percent in said desired rim composition by an amount equal to the amount of said contamination. Then, upon casting said alloy about the core, the contamination of said alloy with the elements of said core will result in the composition of the rim approximating said desired composition.

The hot-working upsetting operations greatly increase the ductility of the rim of the rotor disc 60. If desired, after the disc has been heat treated, as previously described, but prior to the attachment of the rotor blades thereto, the strength of the rim may be increased at the expense of some of its ductility by hot cold-working the rim of the rotor disc 60 after heat treatment of said disc. As generally used, the phrase "hot cold-working" of a metal means forging said metal at a temperature above room temperature but below the normal hot-working temperature range of said metal.

This hot cold-working of the rim of the disc 60 may be accomplished by machining or forging the core of said disc to a thickness less than that of its rim, as indicated at 64 in Figure 11 and then upsetting the rim between flat dies 66 and 68 at a temperature of approximately 1200° F. Obviously this hot cold-working operation should be carried out at a temperature no higher than that at which the core of the disc 60 has previously been tempered. Also, if the hot cold-working temperature and said tempering temperature are the same, then these operations may be carried out simultaneously.

After hot cold-working the rim, it may be desirable to reheat the entire disc to 1200° F. to relieve internal stresses in the rim and/or to age harden said rim.

Obviously, the type of heat treatment, including the nature of the quenching medium and the various temperatures and other numerical factors involved, depend on the composition of the core material as well as on the final physical properties desired. Similarly, the particular temperatures at which the various upsetting operations are carried out depend not only on the composition of the rim and core of the body being upset, but also on the physical properties desired of the rotor disc. For these reasons, the various temperatures and other numerical values mentioned in connection with the aforedescribed forging and heat treatment operations are subject to considerable variation without departing from the scope of the invention.

As previously stated, other steel alloys may be used for the core 12 and the rim 14 of the composite metal body 10. For example, the core 12, instead of having a composition defined by S.A.E. specification number 4340, may have a composition defined by American Iron and Steel Institute type number 410. This latter alloy is a stainless steel hardenable by quenching in air whereas a steel defined by S.A.E. specification number 4340 is not a stainless steel and is hardenable by quenching in oil. If a stainless steel core is used, the bond line between the core and the rim may be moved radially outwardly toward the higher temperatures. That is, the rim of the rotor disc may be made with a smaller radial dimension. When a steel defined by S.A.E. specification number 4340 is used, it has been found satisfactory to have the bond line 62, between the rim and core of the rotor disc 60, disposed so that the temperature of the core does not exceed 600° F.

Instead of using the steel alloy previously specified for the rim 14 of the composite body 10, other alloys may obviously be used. For example, with either of the aforementioned core materials, an alloy may be used having the following elements in percents indicated, within the usual commercial limits:

| Elements: | Per cent |
|---|---|
| Carbon | .30 |
| Chromium | 20.0 |
| Nickel | 20.0 |
| Cobalt | 20.0 |
| Molybdenum | 3.0 |
| Tungsten | 2.0 |
| Columbium | 1.0 |
| Nitrogen | .11 |
| Iron | Balance |

As a further modification, the rotor disc may be forged with a relatively long shaft extending axially from its core. To fabricate such a rotor, the composite cylindrical metal body 10 of Figure 1 from which the rotor disc is forged, is modified to that illustrated at 70 in Figure 12. As illustrated in Figure 12, the core 72 of the body 70 has a shaft-like extension 74 co-axially extending therefrom. The remainder of said core 72 and the rim 76 disposed about and bonded to said core are then axially upset to form the rotor disc as described in connection with the body 10. Thereafter the shaft like extension 74 is forged to the desired shaft length and diameter. However, this forging of the shaft extension 74 may take place simultaneously with the forging of the rotor disc and may even comprise an extrusion operation.

As a still further modification, the composite metal body 10, from which the rotor disc is forged, may be made by casting its core within the rim instead of casting the rim about the core, as previously described. Also, instead of comprising only a rim and a core, the composite body may include a third layer, as illustrated in Figure 13. In Figure 13, a composite cylindrical metal body 80 from which the rotor disc is to be forged, comprises a core 82, a first annular rim 84 disposed about and bonded to the core 82 and a second annular rim 86 disposed about and bonded to said first rim. Thus, the first rim 84 may be cast to the core 82 as previously described in connection with the body 10 and the second rim 86 may be cast to said first rim 84 in a similar manner. With this structure of the body 80, the materials of the core and first and second rims, are selected so that the second or outer rim 86 has the highest heat and corrosion resistant properties and so that the core 82 has the lowest heat and corrosion resistant properties. Obviously, the hot-working upsetting operations for forging a rotor disc from the body 80 are generally similar to the upsetting operations described in connection with the body 10.

As mentioned in connection with Figure 5, when the composite cylindrical body is upset, its rim tends to bend over the end faces of its core. Accordingly, it is possible to cause some of the rim material to form an annular layer over at least a portion of each end face of the core. Because of the high heat and corrosion resistant properties of the rim material, this feature may be desirable in certain installations, where, for example, a large portion of the end faces of the turbine rotor disc are subjected to high temperature gases.

Figures 14, 15, 16, and 17 disclose a modification of the method of fabricating a rotor disc, described in connection with Figures 1 to 9, whereby a thin annular layer of the rim material is disposed over at least a portion of the end faces of the cores of the rotor disc. Figure 14 illustrates a composite cylindrical body 90 formed in a manner similar to the body 38 of Figure 6, except the axial ends of the rim 92 of the body 90 are cut back so as to leave radially thin annular portions 94 bonded to the core 96 adjacent its axial ends, instead of removing the entire radial depth of said rim ends as in Figure 6. The composite cylindrical body 90 is hot-worked to the condition illustrated at 98 in Figure 15 by axially upsetting said body between forging dies 100 and 102 corresponding to the dies 44 and 46 of Figure 7. As a result of this forging operation, a thin annular layer 104 (Figure 15) of rim material now extends over a portion of each end face of the core 106 of the body 98. Said annular layers 104 extend radially inwardly from the rim 108 of the body 98 and like said rim are fused to said core.

The axial ends of the rim 108 of the body 98 are now cut back, as illustrated in Figure 16, so as to leave rim portions 110, of small radial depth, interconnecting the him 108 with each end layer 104. The composite body is now further hot-worked by axially upsetting the body between the flat dies 112 and 114, similar to the dies 56 and 58 of Figure 9, thereby forming the relatively flat cylindrical body or disc 116. The disc 116 is like the disc 60 of Figure 9 except the disc 116 has a pair of thin annular layers 118 of heat and corrosion resistant rim material extending inwardly from the rim 120 of the disc 116 over a large portion of the end faces of the core 122 of said disc. The layers 118, like the rim 120, are fused to the core 122. The disc 116 is then subjected to heat treatment substantially the same as that described in connection with the disc 60. Except for the manner in which the rim is cut back, prior to the forging operations of Figures 15 and 17, the steps in the fabrication of the disc 116 are essentially the same as the steps in the fabrication of the disc 60.

While we have described our invention in detail in its present preferred embodiments, it will be obvious to those skilled in the art, after understanding our invention, that various changes and modifications may be made therein without departing from the spirit or scope thereof. We aim in the appended claims to cover all such modifications.

We claim as our invention:

1. A composite rotor disc for turbines and the like; said disc comprising a core portion and a rim portion bonded to and embracing said core portion with said bond being annular and substantially co-extensive axially with said rim portion; the material of said rim having heat and corrosion resistant properties superior to those of the core material and said rim material extending radially inwardly of said rim portion as a thin layer over at least a portion of both end faces of said core portion to form a heat and corrosion resistant shield therefor, the radial thickness of said rim intermediate its ends being substantially less than the radial dimension of said core.

2. The method of making an article from a cylindrical body having a metallic core and a relatively brittle metallic rim fused to said core; said method comprising axially upsetting said body so as to provide said body with a diameter which decreases toward its ends from a maximum value intermediate its ends; then removing material from both axially spaced ends of said body so as at least to reduce the radial thickness of said rim at said ends; and thereafter further axially upsetting said body and at the same time constraining the resulting radial expansion of the upset body.

3. The method of making an article from a cylindrical body having a metallic core and a relatively brittle metallic rim fused to said core; said method comprising tapering the two axial ends of the rim of said body; axially upsetting said body between forging dies having annular tapering side walls so that the diameter of the resulting upset body is maximum substantially at its mid section and said diameter decreases toward the ends of said body; then further axially upsetting said body while said body is free to expand radially; then removing rim material from both axial ends of said rim so as to at least reduce the thickness of said rim at its axial ends; and then further axially upsetting said body and at the same time constraining the resulting radial expansion of said body to provide the upset body with a cylindrical periphery.

4. The method of making a rotor for turbines or the like from a cylindrical metal body having a metallic core and a metallic rim fused to said core with said rim being relatively brittle and having relatively high heat and corrosion resistant properties; said method comprising axially upsetting said body so as to provide said body with a diameter which decreases toward its ends from a maximum value intermediate its ends; then removing material from both axially spaced ends of said body so as at least to reduce the radial thickness of said rim at said ends; and thereafter further axially upsetting said body and at the same time constraining the resulting radial expansion of the upset body to provide said body with a cylindrical periphery.

5. The method of making a rotor for turbines or the like from a cylindrical metal body having a metallic core and a metallic rim fused to said core with said rim being relatively brittle and having relatively high heat and corrosion resistant properties; said method comprising tapering the two axial ends of the rim of said body; axially upsetting said body between forging dies having annular tapering side walls so that the diameter of the resulting upset body is maximum substantially at its mid section and said diameter decreases toward the ends of said body; then further axially upsetting said body while said body is free to expand radially; then removing rim material from both axial ends of said rim so as to at least reduce the thickness of said rim at its axial ends; and then further axially upsetting said body and at the same time constraining the resulting radial expansion of said body to provide the upset body with a cylindhical periphery.

6. The method of making a rotor for turbines or the like from a cylindrical metal body having a metallic core and a metallic rim fused to said core with said rim being relatively brittle and having relatively high heat and corrosion resistant properties; said method comprising axially upsetting said body so as to provide said body with a diameter which decreases toward its ends from a maximum value intermediate its ends; then removing the radially outer portions of the axial ends of said rim so as to leave a rim having axial end portions which are quite thin relative to the intermediate portion of said rim; and then further axially upsetting said body to deform said thin rim ends over the end faces of said core and at the same time constraining the resulting radlial expansion of said body to provide the upset body with a cylindrical periphery.

7. The method of making a rotor for turbines or the like from a cylindrical metal body having a metallic core, an annular intermediate metallic portion fused to said core and an annular metallic rim fused to said portion with said rim having relatively superior heat and corrosion resistant properties and with said core having relatively inferior heat and corrosion resistant properties; said method comprising axially upsetting said body so as to provide said body with a diameter which decreases toward its ends from a maximum value intermediate its ends; then removing material from both axially spaced ends of said body so as at least to reduce the radial thickness of said rim at said ends; and thereafter further axially upsetting said body and at the same time constraining the resulting radial expansion of the upset body to provide said body with a cylindrical periphery.

8. The method of making a rotor for turbines or the like from a cylindrical metal body having a metallic core and a metallic rim fused to said core with said rim being relatively brittle and having relatively high heat and corrosion resistant properties and with said core being hardenable by heat treatment; said method comprising axially upsetting said body so as to provide said body with a diameter which decreases toward its ends from a maximum value intermediate its ends; then removing material from both axially spaced ends of said body so as at least to reduce the radial thickness of said rim at said ends; thereafter further axially upsetting said body and at the same time constraining the resulting radial expansion of said body to provide the upset body with a cylindrical periphery; and then heat treating said body for hardening its said core, each of said upsetting operations being performed at temperatures sufficiently high to constitute hot working said body.

9. The method of making a rotor for turbines or the like from a cylindrical metal body having a metallic core and a metallic rim fused to said core with said rim being relatively brittle and having relatively high heat and corrosion resistant properties and with said core being hardenable by heat treatment; said method comprising axially upsetting said body so as to provide said body with a diameter which decreases toward its ends; then removing material from both axially spaced ends of said body so as to leave said core projecting axially beyond both ends of said rim; then further axially upsetting said body and at the same time constraining the resulting radial expansion of said body to provide the upset body with a cylindrical periphery; and then heat treating said body for hardening its said core, each of said upsetting operations being performed at temperatures sufficiently high to constitute hot working said body.

10. The method recited in claim 9 and including the step of hot cold-working the rim of the body after said upsetting operations.

11. The method recited in claim 9 in which the last-mentioned upsetting operation reduces the axial length of said body at least approximately to the axial length of the rim of said body prior to said upsetting operation.

12. The method of making a rotor for turbines or the like from a cylindrical metal body having a metallic core and a metallic rim fused to said core with said rim being relatively brittle and having relatively high heat and corrosion resistant properties and with said core being hardenable by heat treatment; said method comprising tapering the two axial ends of the rim of said body; axially upsetting said body between forging dies having annular tapering side walls so that the diameter of the resulting upset body is a maximum substantially at its mid section and said diameter decreases toward the ends of said body; then further axially upsetting said body while said body is free to expand radially; then removing rim material from both axial ends of said rim so as to leave the core projecting axially beyond both ends of said rim; then further axially upsetting said body and at the same time constraining the resulting radial expansion of said body to a cylindrical periphery; and thereafter heat treating said body for hardening its said core, each of said upsetting operations being performed at temperatures sufficiently high to constitute hot working said body.

13. The method of making a rotor for turbine or the like; said method comprising casting in a mold an annular rim of a first metallic material about a solid core of a second metallic material to form a cylindrical body, said first material having relatively high heat and corrosion resistant properties and being rendered more ductile by hot working and said second material being relatively malleable and being hardenable by heat treatment; axially upsetting said cylindrical body so as to provide said body with a diameter which decreases toward its ends from a maximum value intermediate its ends; then removing material from both axially spaced ends of said body so as at least to reduce the radial thickness of said rim at said ends; thereafter further axially upsetting said body and at the same time constraining the resulting radial expansion of said body to provide the upset body with a cylindrical periphery; and then heat treating said body for hardening its said core, each of said upsetting operations being performed at temperatures sufficiently high to constitute hot working said body.

14. The method of making a rotor for turbines or the like from a cylindrical metal body having a metallic core and a metallic rim fused to said core with said rim being relatively brittle and having relatively high heat and corrosion resistant properties; said method comprising tapering the axially spaced ends of the rim of said body by reducing the radial thickness of said rim at said ends, and thereafter axially upsetting said body and at the same time constraining the resulting radial expansion of the body.

15. The method of making a rotor for turbines or the like from a cylindrical metal body having a metallic core and a metallic rim fused to said core with said rim being relatively brittle and having relatively high heat and corrosion resistant properties; said method comprising the steps of removing rim material from both axially spaced ends of said body so as at least to reduce the radial thickness of said rim at said ends; and thereafter axially upsetting said body.

References Cited in the file of this patent

UNITED STATES PATENTS

| Number | Name | Date |
|---|---|---|
| 1,140,681 | Hunt | May 25, 1915 |
| 1,431,183 | Rockwell | Oct. 10, 1922 |
| 1,537,068 | Croselmire | May 12, 1925 |
| 1,884,252 | Robinson | Oct. 25, 1932 |
| 1,939,628 | Liebmann | Dec. 12, 1933 |
| 1,963,745 | Ingersoll | June 19, 1934 |
| 1,983,760 | Ingersoll | Dec. 11, 1934 |
| 2,052,862 | Armstrong | Sept. 1, 1936 |
| 2,061,780 | Short | Nov. 24, 1936 |
| 2,107,943 | Hopkins | Feb. 8, 1938 |
| 2,109,138 | Maulen | Feb. 22, 1938 |
| 2,116,804 | Swanson | May 10, 1938 |
| 2,138,528 | Phillipps | Nov. 29, 1938 |
| 2,174,380 | Doran | Sept. 26, 1939 |
| 2,191,481 | Hopkins | Feb. 27, 1940 |
| 2,338,926 | Gente | Jan. 11, 1944 |
| 2,392,281 | Allen | Jan. 1, 1946 |
| 2,487,304 | Brauchler | Nov. 8, 1949 |
| 2,526,194 | Brauchler | Oct. 17, 1950 |
| 2,560,973 | Martin | July 17, 1951 |

FOREIGN PATENTS

| Number | Country | Date |
|---|---|---|
| 8,854 | Great Britain | May 28, 1889 |